US011980226B2

(12) United States Patent
Walker et al.

(10) Patent No.: US 11,980,226 B2
(45) Date of Patent: May 14, 2024

(54) VAPE CARTRIDGE ASSEMBLY

(71) Applicant: Jupiter Research, LLC, Phoenix, AZ (US)

(72) Inventors: Jordan Walker, Phoenix, AZ (US); Mark Scatterday, Scottsdale, AZ (US)

(73) Assignee: Jupiter Research, LLC, Phoenix, AZ (US)

( * ) Notice: Subject to any disclaimer, the term of this patent is extended or adjusted under 35 U.S.C. 154(b) by 96 days.

(21) Appl. No.: 17/690,468

(22) Filed: Mar. 9, 2022

(65) Prior Publication Data

US 2022/0346444 A1 Nov. 3, 2022

Related U.S. Application Data

(60) Provisional application No. 63/181,619, filed on Apr. 29, 2021.

(51) Int. Cl.
*A24F 40/42* (2020.01)
*H01R 13/62* (2006.01)
*H01R 31/06* (2006.01)

(52) U.S. Cl.
CPC ......... *A24F 40/42* (2020.01); *H01R 13/6205* (2013.01); *H01R 31/06* (2013.01)

(58) Field of Classification Search
CPC ...... A24F 40/42; H01R 13/6205; H01R 31/06
See application file for complete search history.

(56) References Cited

U.S. PATENT DOCUMENTS

| | | | | |
|---|---|---|---|---|
| 7,066,739 | B2 * | 6/2006 | McLeish | H01R 13/6205 439/924.1 |
| 9,220,302 | B2 * | 12/2015 | DePiano | H05B 3/44 |
| 9,877,521 | B1 * | 1/2018 | Gillis | A24F 40/42 |
| 9,888,719 | B2 * | 2/2018 | Cadieux | A24F 40/50 |
| 9,974,334 | B2 * | 5/2018 | Dooly | A24F 40/42 |
| 10,004,259 | B2 * | 6/2018 | Sebastian | A24F 40/30 |
| 10,015,986 | B2 * | 7/2018 | Cadieux | A24F 42/10 |
| 10,531,691 | B2 * | 1/2020 | Sears | A24F 40/40 |
| 10,602,775 | B2 * | 3/2020 | Davis | B65D 83/72 |
| 11,033,054 | B2 * | 6/2021 | Lamb | H04B 5/0037 |
| 11,045,615 | B2 * | 6/2021 | Reevell | A24F 40/42 |
| 11,213,074 | B2 * | 1/2022 | Antonopoulos | H01R 33/72 |
| 11,229,239 | B2 * | 1/2022 | Galloway | A24F 40/53 |
| 11,291,249 | B2 * | 4/2022 | Aller | H05B 3/20 |
| 11,344,064 | B2 * | 5/2022 | Davis | A24F 40/48 |
| 11,372,153 | B2 * | 6/2022 | Novak, III | G02B 6/0083 |
| 11,478,019 | B2 * | 10/2022 | Qiu | A24F 40/53 |
| 11,502,466 | B2 * | 11/2022 | Novak, III | H05B 3/34 |
| 11,504,489 | B2 * | 11/2022 | O'Brien | A24F 40/485 |
| 11,571,022 | B2 * | 2/2023 | Lahoud | A24F 40/90 |
| 11,589,621 | B2 * | 2/2023 | Sur | A24F 40/65 |
| 11,592,793 | B2 * | 2/2023 | Novak, III | H03K 7/08 |
| 11,678,700 | B2 * | 6/2023 | Aller | H05B 1/0244 131/329 |

(Continued)

*Primary Examiner* — Thanh Tam T Le

(74) *Attorney, Agent, or Firm* — Schmeiser, Olsen & Watts LLP

(57) ABSTRACT

A vape cartridge assembly according to various aspects of the subject technology may include a cartridge and an adapter. The cartridge may include a magnetic base configured to releasably and magnetically couple the cartridge to a closed system vape device. The adapter may be configured to releasably and magnetically couple the cartridge to an open system vape device.

7 Claims, 7 Drawing Sheets

(56) References Cited

U.S. PATENT DOCUMENTS

| | | | | |
|---|---|---|---|---|
| 11,696,604 | B2 * | 7/2023 | Henry, Jr. ............... | A24F 40/53<br>131/328 |
| 2019/0001077 | A1 | 3/2019 | Xu et al. | |

* cited by examiner

VAPE CARTRIDGE ASSEMBLY

CROSS-REFERENCE TO RELATED APPLICATION

This application claims the benefit of U.S. Provisional Patent Application Ser. No. 63/181,619, filed on Apr. 29, 2021, and incorporates the disclosure of the application in its entirety by reference.

BACKGROUND OF THE TECHNOLOGY

State of the Art

Vaporizer devices, whether configured as open-system devices or closed-system devices, present an alternative to smoking and work by vaporizing a consumable vaporizable product, e.g., oil, liquid, concentrate, or extract, by heating the vaporizable product at a lower temperature than an open flame so that a user can inhale the vaporizable product in vapor form, rather than smoke.

A conventional cartridge of a vaporizer device typically has a wick capable of soaking up the vaporizable product from a reservoir, a heated coil in contact with the wick, and a connector for connecting the cartridge to a corresponding battery connector on the vaporizer device. A current is typically passed through the coil, heating the wick, and vaporizing the vaporizable liquid. However, the battery connector of a closed system vaporizer device is different than the battery connector of an open system vaporizer device, meaning a conventional cartridge can be connected to either an open system vaporizer device or a closed system vaporizer device, but not both.

Accordingly, what is needed is a cartridge that is reliable and that provides a user with the option to use the cartridge with both an open system vaporizer device and a closed system vaporizer device.

SUMMARY OF THE TECHNOLOGY

A vape cartridge assembly according to various aspects of the subject technology may comprise a cartridge and an adapter. The cartridge may comprise a magnetic base configured to releasably and magnetically couple the cartridge to a closed system vape device. The adapter may be configured to releasably and magnetically couple the cartridge to an open system vape device.

BRIEF DESCRIPTION OF THE DRAWINGS

A more complete understanding of the subject technology may be derived by referring to the detailed description and claims when considered in connection with the following illustrative figures. In the following figures, like reference numbers refer to similar elements and steps throughout the figures.

DETAILED DESCRIPTION OF EMBODIMENTS

The subject technology may be described in terms of functional block components. Such functional blocks may be realized by any number of components configured to perform the specified functions and achieve the various results. For example, the subject technology may employ various, adapters, batteries, cartridges, coils, heating elements, inlets, outlets, wicks, reservoirs, vaporizable liquids, and the like, which may carry out a variety of functions. In addition, the subject technology may be practiced in conjunction with any one of various vaporizer devices, and the cartridge assembly described herein is merely one exemplary application for the technology.

Referring to FIGS. 1-7, an exemplary cartridge assembly 100 may be integrated in any suitable vaporizer device, such as a closed system vape device (not shown) and an open system vape device (not shown), for vaporizing a vaporizable liquid. In various applications, the cartridge assembly 100 may be releasably and magnetically coupled to the vaporizer device. For the purposes of this Application, the term "closed system vape device" means a closed-source vaporizer device that is configured to operate with a cartridge that may be electrically connected to a power supply in a way that is unique to one type of cartridge and/or manufacturer. The term "open system vape device" means an open-source vaporizer device that is configured to operate with a variety of different cartridges that may be fabricated by one or more manufacturers. According to various embodiments, the cartridge assembly 100 may comprise a cartridge 105 and an adapter 110.

Figure 6A:
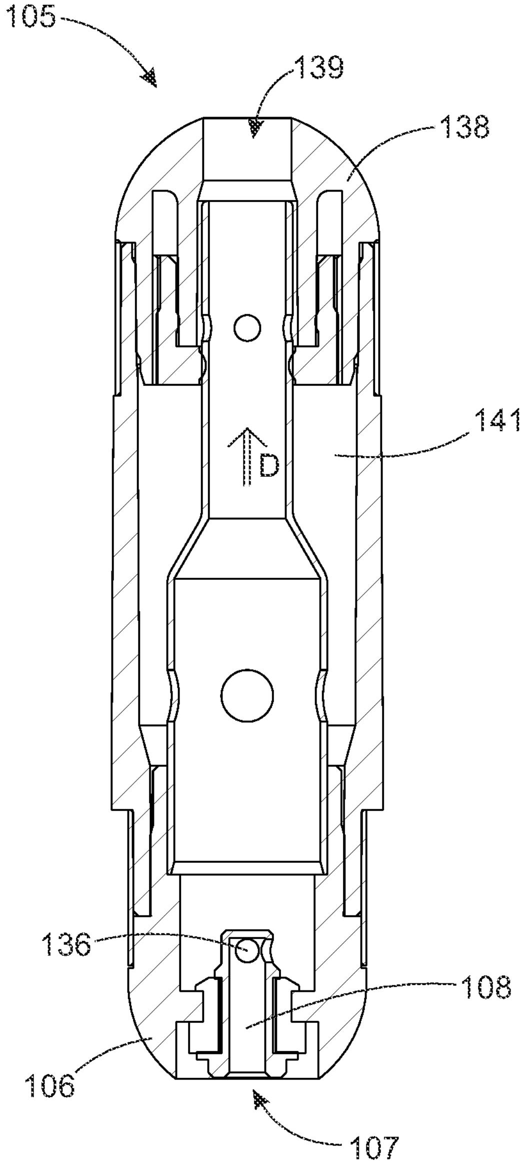
FIG. 6A is a sectional view of the cartridge shown in FIG. 3 taken along line B-B.
Figure 6B:
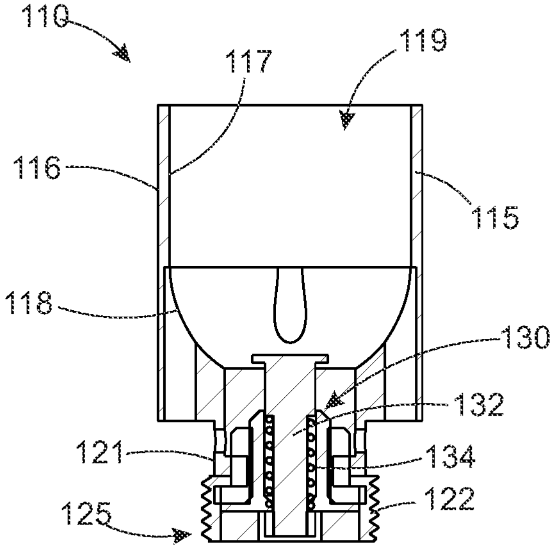
FIG. 6B is a sectional view of the adapter shown in FIG. 4 taken along line C-C.
Figure 6C:
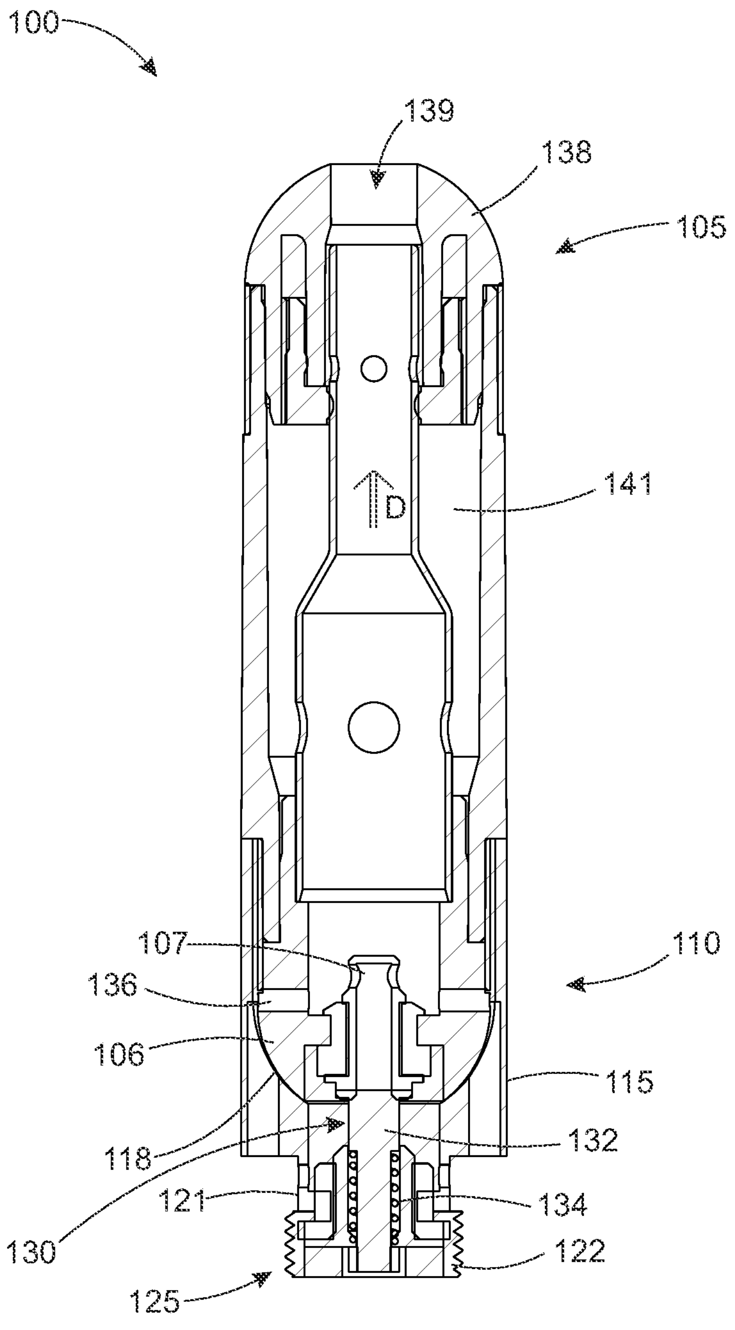
FIG. 6C is a sectional view of the vape cartridge assembly shown in FIG. 1 taken along line A-A.
Figure 7A:
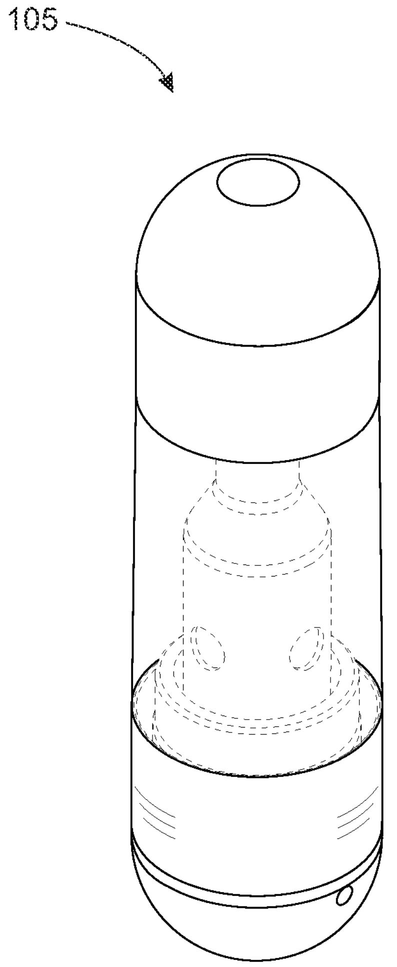
FIG. 7A is a perspective view of a cartridge in accordance with an alternative embodiment of the subject technology.
Figure 7B:
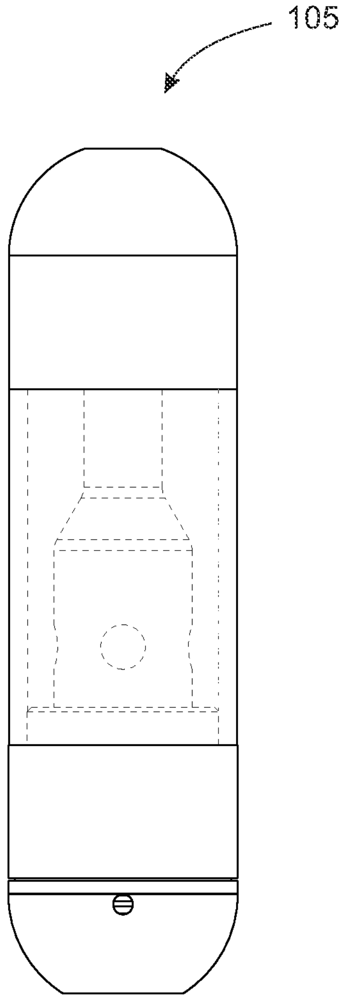
FIG. 7B is a side view of a cartridge in accordance with an alternative embodiment of the subject technology.

In various embodiments, and referring now to FIGS. 6A and 6C, the cartridge 105 may comprise a magnetic base 106 and a first pin assembly 107 that may protrude through an aperture (not shown) located on the magnetic base 106. The first pin assembly 107 may comprise any suitable pin assembly configured to electrically couple the cartridge 105 to the closed system vape device. The cartridge 105 may comprise any suitable size or shape. For example, in one embodiment, the cartridge 105 may be cylindrical-shaped and may comprise a diameter of about 10.5 millimeters (mm) and a height of about 40 mm.

The cartridge 105 may be in fluid communication with a reservoir 141. In some embodiments, the reservoir 141 may be a pre-filled and non-refillable reservoir. In other embodiments, the reservoir 141 may be a refillable reservoir.

Figure 1:
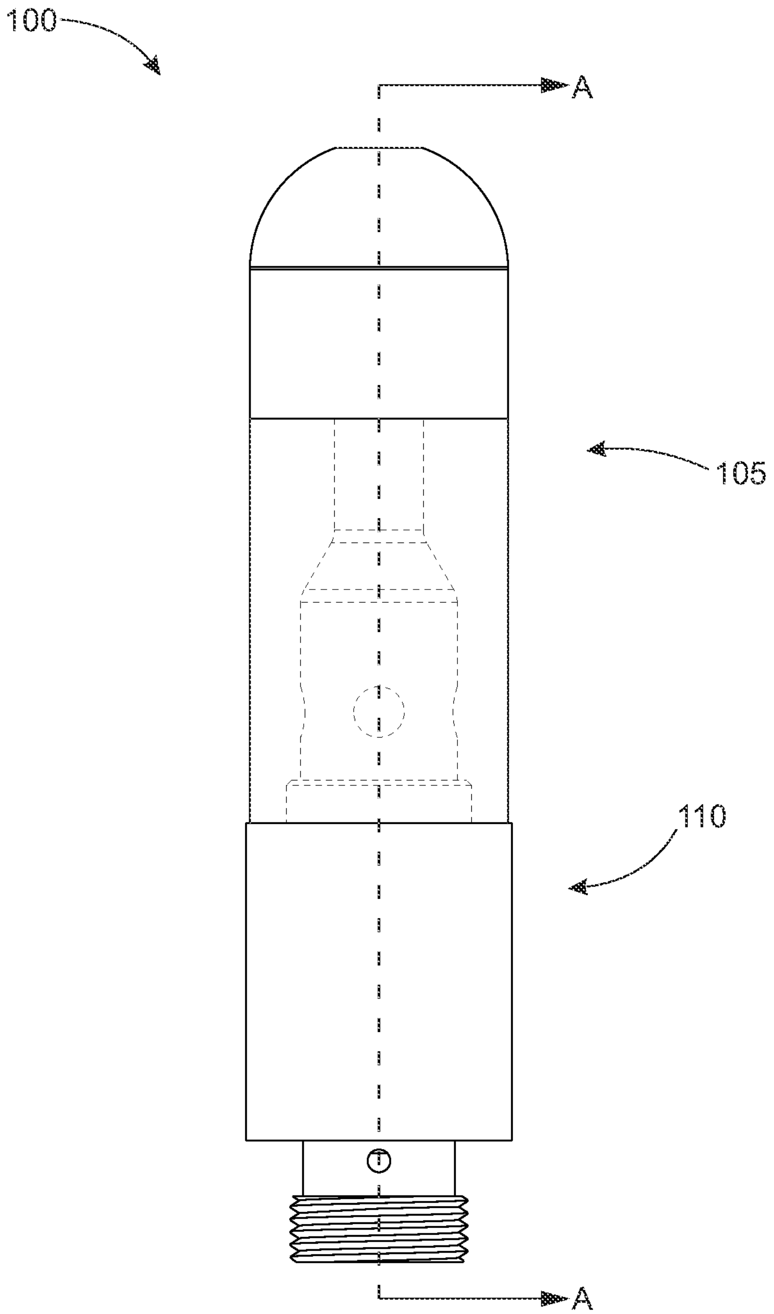
FIG. 1 is a side view of a vape cartridge assembly in accordance with an embodiment of the subject technology.
Figure 2:
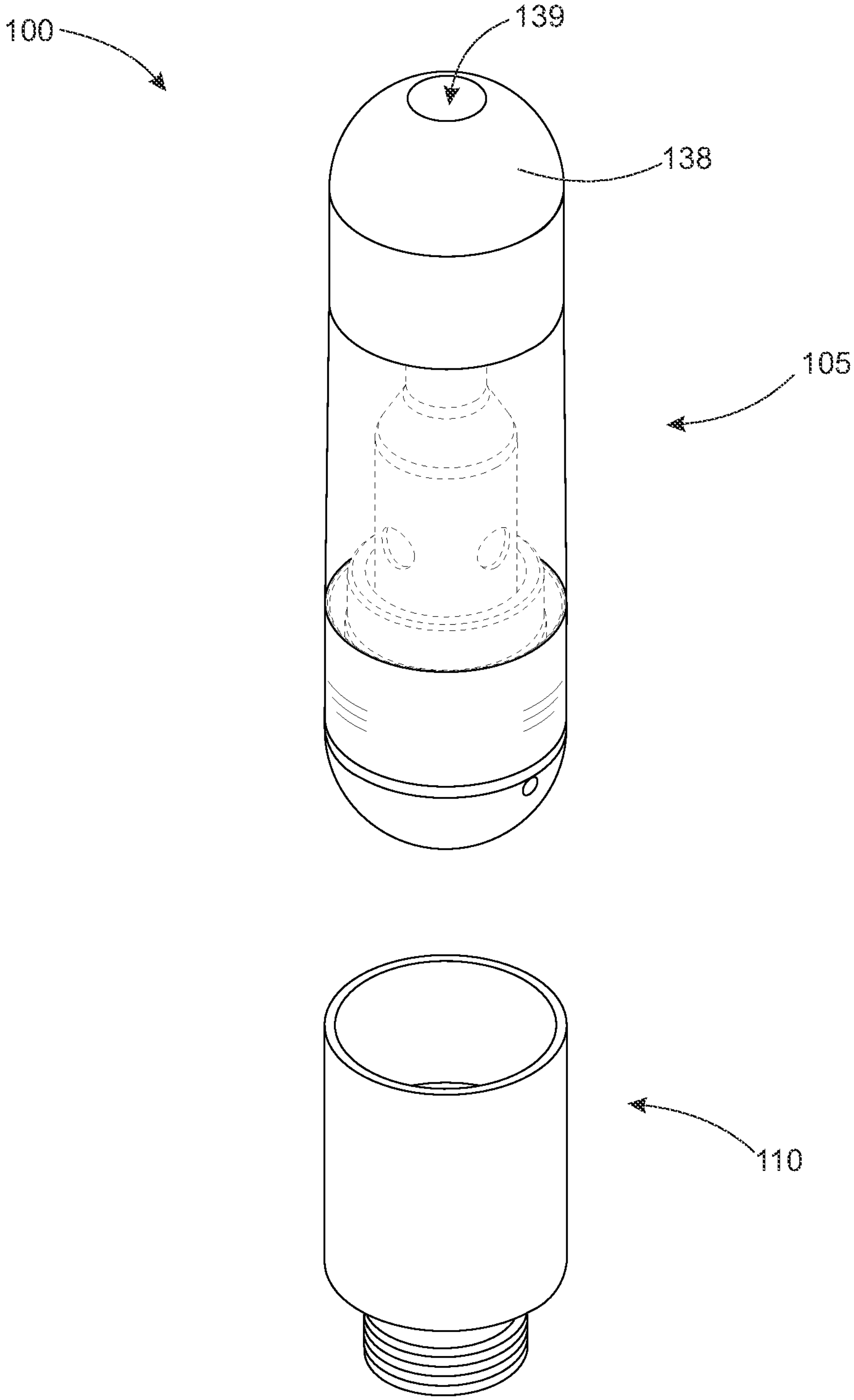
FIG. 2 is an exploded perspective view of a cartridge and an adapter in accordance with an embodiment of the subject technology.
Figure 3:
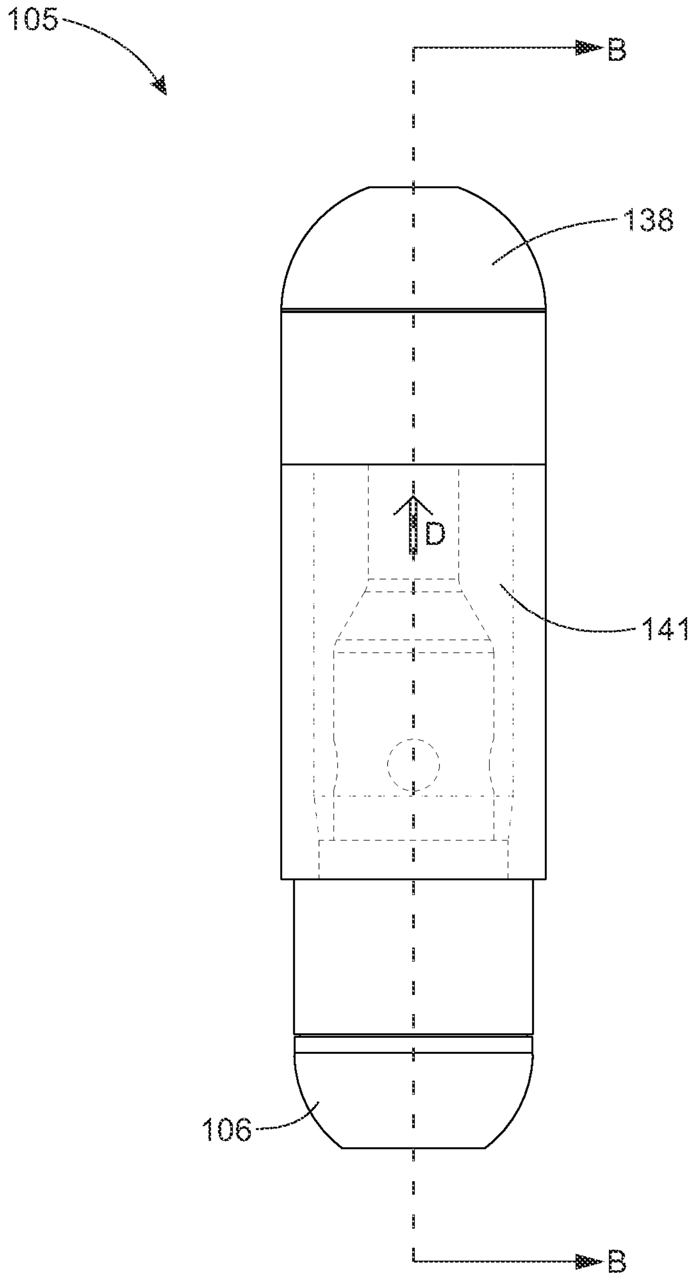
FIG. 3 is a side view of a cartridge in accordance with an embodiment of the subject technology.
Figure 4:
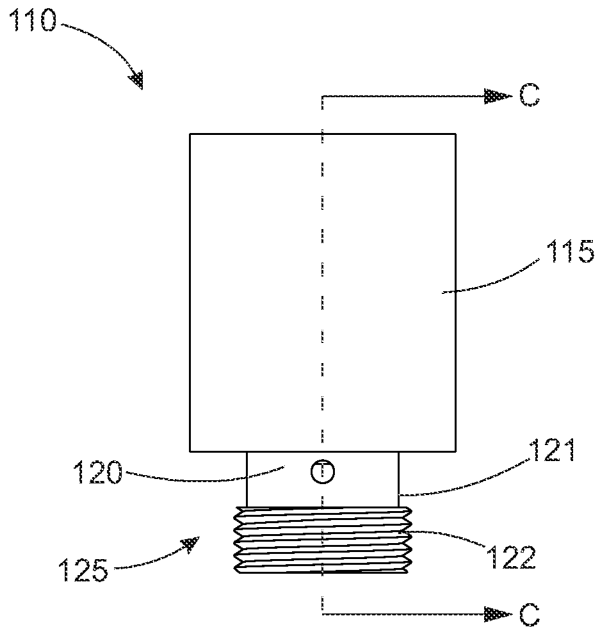
FIG. 4 is a side view of an adapter in accordance with an embodiment of the subject technology.
Figure 5:
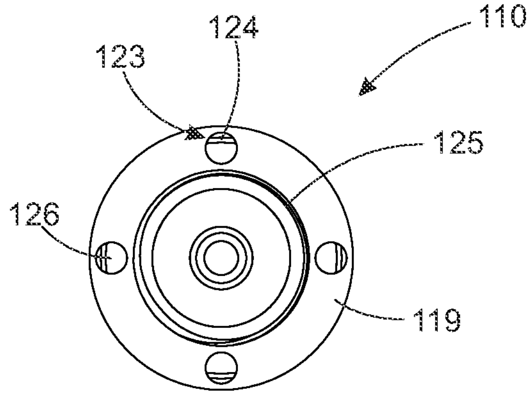
FIG. 5 is a bottom view of an adapter in accordance with an embodiment of the subject technology.

In an exemplary embodiment, and referring now to FIGS. 4, 5, and 6B, the adapter 110 may be configured to operably couple the cartridge 105 to the open system vape device. Specifically, the adapter 110 may be configured to operably couple the cartridge 105 to the open system vape device when the cartridge 105 is receivably engaged to the adapter 110 and the adapter 110 is coupled to the open system vape device. The adapter 110 may comprise a body portion 115 and a neck portion 120 extending away from the body portion 115. The adapter 110 may comprise any suitable size or shape. For example, in one embodiment, the adapter 110 may comprise a diameter of about 10.5 mm and a height of about 20 mm.

The body portion 115 may comprise an outer surface 116 and an inner surface 117 that defines a receptacle cavity 119 in the adapter 110. The inner surface 117 of the body portion 115 may be configured to receivably engage the cartridge 105. In various embodiments, the inner surface 117 of the body portion 115 may comprise a curved surface 118 to better conform to a curvature of the cartridge 105 to permit convenient positioning of the cartridge 105 when the cartridge 105 is inserted into the adapter 110. In other embodiments, the inner surface 117 of the adapter 110 may comprise a flat surface. The inner surface 117 may, however, be shaped in any suitable manner to engage the cartridge 105.

The body portion 115 of the adapter 110 may further comprise a magnetic coupling component 123 located near the curved surface portion 118 of the adapter 110 that is configured to couple the magnetic base 106 of the cartridge 105 to the curved surface portion 118. For example, in one embodiment, the magnetic coupling component 123 may comprise a plurality of magnets 124, where each magnet 124 may be disposed within a respective one of a plurality of cavities 126. The plurality of cavities 126 may be formed in a sidewall 119 of the body portion 115 and may be circumferentially spaced apart.

The magnetic coupling component 123 may be further configured to selectively disengage the magnetic base 106 of the cartridge 105 from the curved surface portion 118 of the adapter 110 and the open system vape device between uses. The magnetic coupling component 123 may comprise any suitable system or device configured to couple the magnetic base 106 of the cartridge 105 to the adapter 110 and the open system vape device.

The adapter 110 may further comprise a locking component 125 formed on a circular outer edge 121 of the neck portion 120 that is configured to couple the neck portion 120 to the open system vape device. The locking component 125 may comprise any suitable device or system for locking the adapter 110 to the open system vape device and operably coupling the cartridge 105 to the open system vape device.

In one embodiment, the locking component 125 may be configured to couple the adapter 110 to the open system vape device in a locked position, whereby the adapter 110 is twisted into the locked position by pressing the adapter 110 towards the open system vape device and turning the adapter 110 to lock into position. Similarly, the locking component 125 may decouple the adapter 110 from the open system vape device in an unlocked position, whereby the adapter 110 is twisted into the unlocked position by turning the adapter 110 to disengage. For example, the open system vape device may comprise threads (not shown). The threads may be in mating engagement with corresponding threads 122 formed on an outside of the circular outer edge 121 of the neck portion 120, so that the adapter 110 may be coupled to the open system vape device. The corresponding threads 122 on the circular outer edge 121 of the neck portion 120 may be formed spirally and circumferentially on the circular outer edge 121.

Referring now to FIGS. 6A-C, the adapter 110 may further comprise a second pin assembly 130. The second pin assembly 130 may comprise a second pin 132 and a biasing component 134 configured to bias the second pin 132 upwardly into the receptacle cavity 119 of the adapter 110. The second pin 132 may protrude through an aperture (not shown) located on the curved surface portion 118 of the adapter 110 to allow the second pin 132 to engage a first pin 108 of the first pin assembly 107 and electrically couple the cartridge 105 to the adapter 110 and the open system vape device when the cartridge 105 is receivably engaged to the adapter 110.

In operation, a user may operably couple the cartridge 105 to the closed system vape device in any suitable manner understood by those skilled in the art. Alternatively, the user may operably couple the cartridge 105 to the open system device in the manner previously described.

In the case where the cartridge 105 is operably coupled to the open system vape device, the open system vape device may be turned on by a sensor (not shown) or by pressing a button or switch. For example, in the case where the open system vape device is “draw-activated”, the user may turn on the open system vape device by drawing air into the cartridge 105 via an inlet 136 by inhaling through a mouthpiece 138 connected to an outlet 139. When the user inhales, a negative pressure may be induced inside the open system vape device. The negative pressure induced inside the open system vape device may cause the sensor to close a pressure switch (not shown), thereby closing the circuit between a battery (not shown) disposed within the open system vape device and various components of the open system vape device. Once the pressure switch (not shown) is closed, the battery may supply power to the various components of the open system vape device, including a heating element (not shown). Because the heating element may be in contact with a wick (not shown) capable of soaking up the vaporizable liquid from the reservoir 141, the heat generated by the heating element may be transferred to the wick. Accordingly, the heating element may vaporize a portion of the vaporizable liquid by heating the wick to a temperature sufficient to generate the vapor. Once the vapor is produced, it may mix with the air drawn into the cartridge 100 via the inlet 136, and the resulting aerosol (vapor and airflow) may travel as an aerosol stream along the airflow path D where it may be expelled via the outlet 139 and inhaled through the mouthpiece 138.

In the foregoing specification, the technology has been described with reference to specific embodiments. Various modifications and changes may be made, however, without departing from the scope of the subject technology as set forth in the claims. The specification and figures are illustrative, rather than restrictive, and modifications are intended to be included within the scope of the subject technology. Accordingly, the scope of the technology should be determined by the claims and their legal equivalents rather than by merely the examples described. For example, the components and/or elements recited in any apparatus claims may be assembled or otherwise operationally configured in a variety of permutations and are accordingly not limited to the specific configuration recited in the claims. Benefits, other advantages, and solutions to problems have been described above with regard to particular embodiments; however, any benefit, advantage, solution to problem or any element that may cause any particular benefit, advantage, or solution to occur or to become more pronounced are not to be construed as critical, required, or essential features or components of any or all the claims.

As used herein, the terms “comprise,” “comprises,” “comprising,” “having,” “including,” “includes,” or any variation thereof, are intended to reference a non-exclusive inclusion, such that a process, method, article, composition, or apparatus that comprises a list of elements does not include only those elements recited but may also include other elements not expressly listed or inherent to such process, method, article, composition, or apparatus. Other combinations and/or modifications of the above-described structures, arrangements, applications, proportions, elements, materials, or components used in the practice of the subject technology, in addition to those not specifically recited, may be varied, or otherwise particularly adapted to specific environments, manufacturing specifications, design parameters or other operating requirements without departing from the general principles of the same.

The invention claimed is:

1. A vape cartridge assembly, comprising:
- a cartridge comprising a magnetic base to releasably and magnetically couple the cartridge to a closed system vape device; and
- an adapter couplable to an open system vape device, wherein the adapter releasably and magnetically couples the cartridge to the open system vape device.

2. The vape cartridge assembly of claim 1, wherein the cartridge comprises a first pin assembly configured to electrically couple the cartridge to the closed system vape device.

3. The vape cartridge assembly of claim 2, wherein the adapter comprises:
- a body portion, comprising:
  - an outer surface and an inner surface defining a receptacle cavity in the adapter, wherein:
    - the inner surface is configured to receivably engage the cartridge; and
    - the inner surface comprises a curved surface portion configured to be positioned against the magnetic base;
  - an open end opposite the curved surface portion terminating in a peripheral annular edge; and
- a neck portion extending away from the body portion.

4. The vape cartridge assembly of claim 3, wherein:
- the neck portion of the adapter comprises a circular outer edge; and
- the circular outer edge comprises a locking component configured to constrain a movement of the adapter with respect to the open system vape device.

5. The vape cartridge assembly of claim 4, wherein the locking component is further configured to disengage the adapter from the open system vape device.

6. The vape cartridge assembly of claim 3, wherein the body portion of the adapter further comprises a magnetic coupling component configured to selectively engage and disengage the magnetic base of the cartridge from the adapter.

7. The vape cartridge assembly of claim 3, wherein the neck portion of the adapter comprises a second pin assembly comprising:
- a second pin; and
- a biasing component configured to bias the second pin upwardly into the receptacle cavity, wherein the second pin is electrically coupled to the first pin assembly when the cartridge is receivably engaged to the adapter.

* * * * *